(12) United States Patent
Hartmann et al.

(10) Patent No.: US 10,386,536 B2
(45) Date of Patent: Aug. 20, 2019

(54) SYSTEM AND METHOD FOR CORRECTION OF DOWNHOLE MEASUREMENTS

(71) Applicants: Andreas Hartmann, Celle (DE); Hanno Reckmann, Nienhagen (DE); Hans-Martin Maurer, Houston, TX (US); Christian Fulda, Sehnde (DE); Dorothea Marion Fischer, Hannover (DE)

(72) Inventors: Andreas Hartmann, Celle (DE); Hanno Reckmann, Nienhagen (DE); Hans-Martin Maurer, Houston, TX (US); Christian Fulda, Sehnde (DE); Dorothea Marion Fischer, Hannover (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 90 days.

(21) Appl. No.: 15/414,149

(22) Filed: Jan. 24, 2017

(65) Prior Publication Data

US 2017/0131433 A1 May 11, 2017

Related U.S. Application Data

(63) Continuation-in-part of application No. 13/242,487, filed on Sep. 23, 2011, now abandoned.

(51) Int. Cl.
*G01V 11/00* (2006.01)
*G01B 21/24* (2006.01)
(Continued)

(52) U.S. Cl.
CPC ............. *G01V 11/005* (2013.01); *E21B 7/06* (2013.01); *E21B 47/00* (2013.01); *E21B 47/12* (2013.01);
(Continued)

(58) Field of Classification Search
CPC ......... E21B 47/00; E21B 47/12; G01B 21/32; G01V 11/005; G01V 3/18
See application file for complete search history.

(56) References Cited

U.S. PATENT DOCUMENTS 5,585,790 A * 12/1996 Luling .................... G01B 7/31
340/853.8
6,101,447 A * 8/2000 Poe, Jr. .................. E21B 49/00
702/13
(Continued)

FOREIGN PATENT DOCUMENTS

EP      2180349 A2    4/2010

OTHER PUBLICATIONS

Notification of Transmittal of the International Search Report and the Written Opinion of the International Searching Authority, or the Declaration; PCT/US2012/056048; dated Mar. 11, 2013.
(Continued)

*Primary Examiner* — Elias Desta
(74) *Attorney, Agent, or Firm* — Cantor Colburn LLP

(57) ABSTRACT

An embodiment of a system for estimating a parameter of an earth formation includes at least one formation parameter sensor disposed at a first downhole component and configured to measure a parameter of an earth formation to generate formation parameter data, and one or more processors in operable communication with the at least one formation parameter sensor. The one or more processors are configured to perform: generating a mechanics model of at least one of the first downhole component and a second downhole component, the mechanics model based on geometrical data representing at least one of the first downhole component and the second downhole component; estimating a misalignment of the at least one formation parameter sensor by using the mechanics model; and correcting the formation parameter data based on the misalignment.

20 Claims, 9 Drawing Sheets

(51) Int. Cl.
  *G01B 21/32* (2006.01)
  *E21B 47/00* (2012.01)
  *E21B 47/12* (2012.01)
  *E21B 7/06* (2006.01)
  *G01V 3/18* (2006.01)
  *G01V 13/00* (2006.01)

(52) U.S. Cl.
  CPC ............. *G01B 21/24* (2013.01); *G01B 21/32* (2013.01); *G01V 3/18* (2013.01); *G01V 13/00* (2013.01)

(56) References Cited

U.S. PATENT DOCUMENTS

| | | |
|---|---|---|
| 6,206,108 B1 | 3/2001 | MacDonald et al. |
| 6,633,816 B2 | 10/2003 | Shirasaka et al. |
| 7,054,750 B2 | 5/2006 | Rodney et al. |
| 7,225,550 B2 | 6/2007 | Ekseth et al. |
| 7,503,403 B2 | 3/2009 | Jogi et al. |
| 7,946,357 B2* | 5/2011 | Trinh ................. E21B 45/00 175/40 |
| 8,185,312 B2 | 5/2012 | Ekseth et al. |
| 8,286,729 B2 | 10/2012 | Reckmann et al. |
| 8,536,871 B2 | 9/2013 | Li et al. |
| 9,062,540 B2 | 6/2015 | Hartmann et al. |
| 2004/0007357 A1 | 1/2004 | Gabler et al. |
| 2006/0276969 A1 | 12/2006 | Georgi et al. |
| 2007/0032958 A1 | 2/2007 | Chen |
| 2009/0205867 A1 | 8/2009 | Reckmann et al. |
| 2009/0277629 A1 | 11/2009 | Mendez et al. |
| 2010/0307742 A1 | 12/2010 | Phillips et al. |
| 2012/0105076 A1 | 5/2012 | Li et al. |
| 2013/0076526 A1 | 3/2013 | Schuberth et al. |

OTHER PUBLICATIONS

Ray, Louis I. et al., Using Downhole Displacement and Inferred Production for Verification of Measured Test Data, Jun. 19-22, 2000, 1-13, Society of Petroleum Engineers.

* cited by examiner

SYSTEM AND METHOD FOR CORRECTION OF DOWNHOLE MEASUREMENTS

CROSS REFERENCE TO RELATED APPLICATION

The present application is a continuation-in-part of U.S. patent application Ser. No. 13/242,487 filed Sep. 23, 2011 of which is hereby incorporated in its entirety herein.

BACKGROUND

In downhole operations such as drilling, geosteering and measurement-while-drilling (MWD) operations, sensor devices are included with a borehole string that measure various parameters of a formation and/or a borehole. Such sensor devices are typically arranged to have a desired orientation or alignment, and resulting measurements are analyzed based on such alignments. Various environmental effects and downhole forces can cause bending or other deformation of a downhole component, and consequently can result in misalignment of sensors devices, which can negatively affect measurement data.

SUMMARY

An embodiment of a system for estimating a parameter of an earth formation includes at least one formation parameter sensor disposed at a first downhole component and configured to measure a parameter of an earth formation to generate formation parameter data, and one or more processors in operable communication with the at least one formation parameter sensor. The one or more processors are configured to perform: generating a mechanics model of at least one of the first downhole component and a second downhole component, the mechanics model based on geometrical data representing at least one of the first downhole component and the second downhole component; estimating a misalignment of the at least one formation parameter sensor by using the mechanics model; and correcting the formation parameter data based on the misalignment.

An embodiment of a method of estimating a parameter of an earth formation includes measuring, by at least one formation parameter sensor disposed at a first downhole component, a parameter of an earth formation and generating formation parameter data, and generating, by one or more processors in operable communication with the at least one formation parameter sensor, a mechanics model of at least one of the first downhole component and a second downhole component, the mechanics model based on geometrical data representing at least one of the first downhole component and the second downhole component. The method also includes estimating a misalignment of the at least one formation parameter sensor by using the mechanics model, and correcting the formation parameter data based on the misalignment.

BRIEF DESCRIPTION OF THE DRAWINGS

The following descriptions should not be considered limiting in any way. With reference to the accompanying drawings, like elements are numbered alike.

DETAILED DESCRIPTION

The systems and methods described herein provide for modeling of downhole component deformation, bending, orientation and/or alignment and correction of downhole sensor measurements. Examples of a downhole component include a drilling assembly, a drill string, a downhole measurement tool and a bottomhole assembly (BHA). A method includes taking measurements of various forces and environmental parameters exerted on the downhole component and inputting such force measurements along with pre-selected geometric and mechanical property data to build a mathematical model of the component. These inputs may be used to generate a model that predicts deformation of the component, for example at locations of the formation parameter sensors, and along a selected length or portion of the component. In one embodiment, the method includes transmitting data to a processor and updating and/or generating the model in real time during a downhole operation. The model may utilize a static or a dynamic approach. The model is configured to provide bending and other deformation information at formation parameter sensor locations, as well as along portions of the component between the formation parameter sensors and otherwise away from the sensor locations. The model may be utilized by a user for real time correction of other downhole parameter measurements (e.g., formation evaluation measurements) based on an estimated alignment or misalignment of measurement devices such as formation evaluation (FE) sensors.

In one embodiment, the model is constructed based on geometric data and drilling dynamics data (e.g., WOB and ROP) or other data that describes mechanical forces on the component. Additional information may be acquired from one or more directional survey sensors if available, although such survey information is not required, or at least not required at or near the locations of the formation parameter sensors. For example, the model can be constructed using drilling dynamics data without any downhole survey data.

Figure 1:
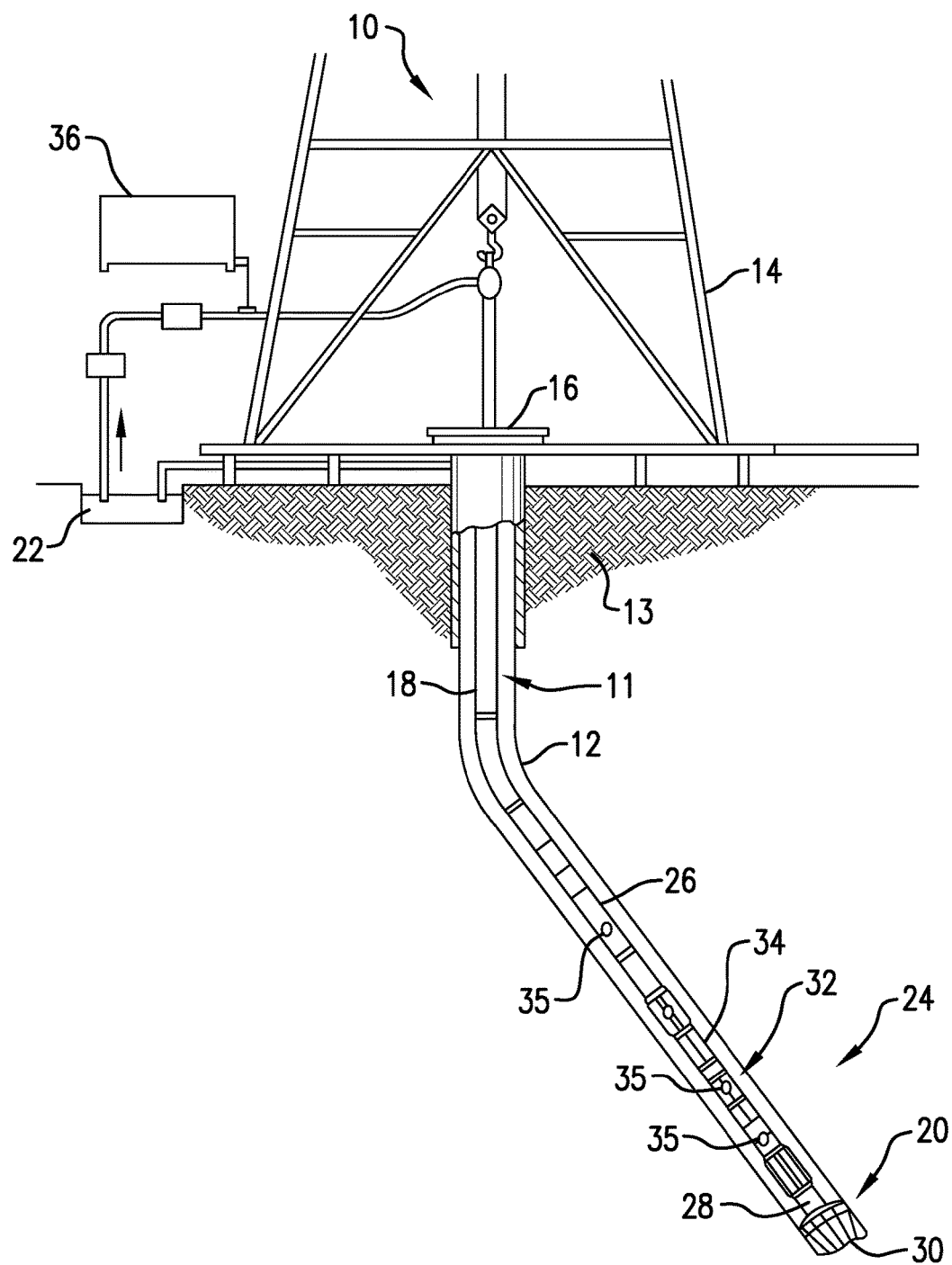
FIG. 1 is a side cross-sectional view of an embodiment of a drilling and/or geosteering system.

Referring to FIG. 1, an exemplary embodiment of a well drilling, logging and/or geosteering system 10 includes a drill string 11 that is shown disposed in a wellbore or borehole 12 that penetrates at least one earth formation 13 during a drilling operation and makes measurements of properties of the formation 13 and/or the borehole 12 downhole. As described herein, "borehole" or "wellbore" refers to a single hole that makes up all or part of a drilled well. As described herein, "formations" refer to the various features and materials that may be encountered in a subsurface environment and surround the borehole 12.

In one embodiment, the system 10 includes a conventional derrick 14 that supports a rotary table 16 that is rotated at a desired rotational speed. The drill string 11 includes one or more drill pipe sections 18 that extend downward into the borehole 12 from the rotary table 16, and is connected to a drilling assembly 20. Drilling fluid or drilling mud 22 is pumped through the drill string 11 and/or the borehole 12. The well drilling system 10 also includes a bottomhole assembly (BHA) 24. In one embodiment, a drill motor or mud motor 26 is coupled to the drilling assembly 20 and rotates the drilling assembly 20 when the drilling fluid 22 is passed through the mud motor 26 under pressure.

In one embodiment, the drilling assembly 20 includes a steering assembly including a shaft 28 connected to a drill bit 30. The shaft 28, which in one embodiment is coupled to the mud motor, is utilized in geosteering operations to steer the drill bit 30 and the drill string 11 through the formation 13.

In one embodiment, the drilling assembly 20 is included in the bottomhole assembly (BHA) 24, which is disposable within the system 10 at or near the downhole portion of the drill string 11. The system 10 includes any number of downhole tools 32 for various processes including formation drilling, geosteering, and formation evaluation (FE) for measuring versus depth and/or time one or more physical quantities in or around a borehole 12. The tools 32 may be included in or embodied as a BHA, drill string component or other suitable carrier. A "carrier" as described herein means any device, device component, combination of devices, media and/or member that may be used to convey, house, support or otherwise facilitate the use of another device, device component, combination of devices, media and/or member. Exemplary non-limiting carriers include drill strings of the coiled tubing type, of the jointed pipe type and any combination or portion thereof. Other carrier examples include casing pipes, wirelines, wireline sondes, slickline sondes, drop shots, downhole subs, bottom-hole assemblies, and drill strings.

In one embodiment, one or more downhole components, such as the drill string 11, the downhole tools 32, the drilling assembly 20 and the drill bit 30, include sensor devices 34 configured to measure various parameters of the formation 13 and/or borehole 12. For example, one or more formation parameter sensors 34 (or sensor assemblies such as MWD subs) are configured for formation evaluation measurements and/or other formation parameters of interest (referred to herein as "evaluation parameters") relating to the formation 13, borehole 12, geophysical characteristics, borehole fluids and boundary conditions. These sensors 34 may include formation evaluation sensors (e.g., gamma, resistivity, conductivity, dielectric constant, acoustic velocity, acoustic travel time, distance to bed, distance to anomaly, distance to fracture/fault, water saturation, porosity, density and permeability), sensors for measuring borehole parameters (e.g., borehole size, standoff, and borehole roughness), sensors for measuring borehole or downhole fluid parameters (e.g., viscosity, density, clarity, rheology, pH level, and chemical composition including gas, oil and water contents), boundary condition sensors, and sensors for measuring physical and chemical properties of the borehole fluid.

An example of a sensor or sensor assembly 34 is a resistivity sensor that includes one or more electromagnetic (EM) transmitters (e.g., antennas) and one or more EM receivers (e.g., antennas). The transmitters and receivers are arrayed along the drill string 11 and/or the BHA 24. Typically the transmitters are separated axially (i.e., along the longitudinal axis of the drill string 11) by a selected distance. For example, LWD tools may include transmitters and receivers that are separated by as much as several meters, depending on the desired depth of investigation. Other examples of sensors or sensor assemblies include sensors having transmitting and receiving components configured to have specific orientations relative to each other, such as continuous wave EM sensors, transient EM sensors and acoustic sensors.

The system 10 may also include one or more sensors 35 for measuring force, operational and/or environmental parameters related to bending or other deformation of one or more downhole components. The sensors 35 may encompass any sensors, located at the surface and/or downhole, which provide measurements relating to bending or other deformation of a downhole component. Such sensors may include discrete deformation sensors (e.g., located at or near formation parameter sensors 34), including sensors for measuring deflection, inclination and/or azimuth (e.g., magnetometers, gravimeters, accelerometers, strain gauges, etc.). Other sensors include strain sensors for measurement of axial and/or torsion forces, such as torque on bit sensors, weight on bit sensors, and rotation sensors. One or more of the above sensors (which may be disposed downhole and/or at the surface) may be used to measure drilling dynamics parameters such as weight on bit (WOB), torque on bit (TOB), bending, bending orientation, rotational rate, rate of penetration and fluid flow properties.

In one embodiment, the parameter sensors 34, the sensors 35 and/or other downhole components include and/or are configured to communicate with a processor to transmit, receive, measure and/or estimate directional or bulk data values of the downhole components, borehole 12 and/or the formation 13. For example, the sensors 34, deformation sensors 35 and/or BHA 24 are equipped with transmission equipment to communicate with a processor such as a surface processing unit 36. Such transmission equipment may take any desired form, and different transmission media and connections may be used. Examples of connections include wired, fiber optic, acoustic, wireless connections and mud pulse telemetry.

In the borehole 12, a downhole component such as the drill string 11 (or certain lengths of the drill string 11) and/or the BHA 24 may be mechanically bent or deformed by forces arising from, e.g., the weight of the drill string 11 and/or by the curvature of the borehole 12. This bending or deformation can cause sensors such as the formation parameter sensors 34 to be misaligned and result in measurement errors. For example, in a resistivity tool, bending can cause significant tilting and eccentric positioning of antennas over the transmitter-receiver distance or receiver-receiver distance. This is particularly true for co-axial measurements, such as when antennas are originally aligned to each other, cross-component measurements, such as when antennas are oriented at 90° with respect to each other, or tilted measurements, such as when antennas are oriented at angle between 0° and 90° with respect to each other.

To compensate for the effect of mechanical bending of the BHA 24, the spatial position and orientation of the transmitters/receivers in the borehole 12 and/or in the formation 13 is estimated. The relative positioning or orientation of the sensors (e.g., the transmitter and/or receiver antennas) can be measured directly, or a determination of the component deformation is used to estimate the relative positioning or orientation based on a mathematical mechanics model of the component (and/or one or more additional downhole components).

Figure 2:
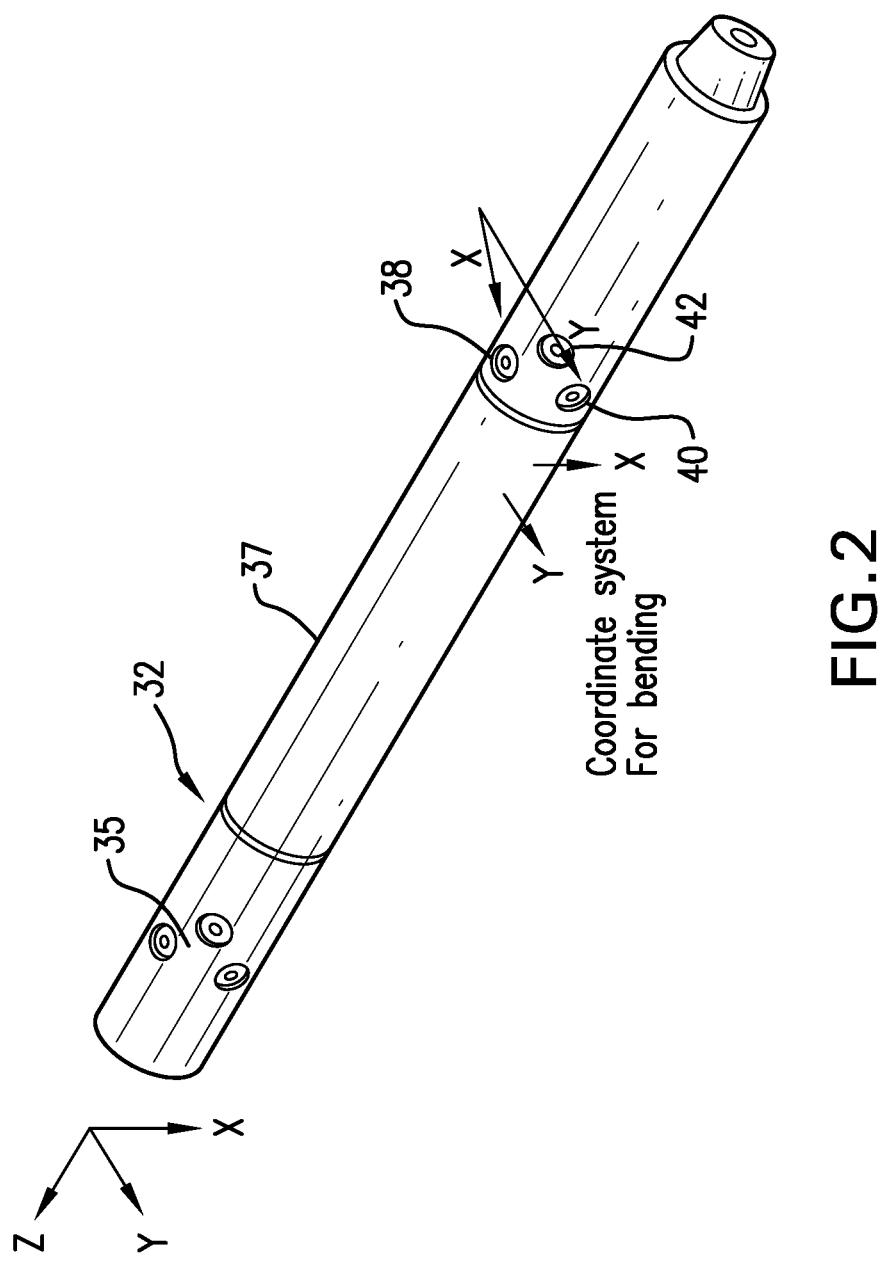
FIG. 2 is a perspective view of a downhole tool including an array of directional sensors.

FIG. 2 shows an example of a downhole component that includes orthogonally positioned deformation sensors located at, proximate to, or at some distance from each formation parameter sensor (not shown). In this example, discrete deformation sensors 35 are incorporated into a drilling sensor sub 37. In one embodiment, two or more deformation sensors 35 or two or more sets of deformation sensors 35 are distributed along the axis of the downhole component and used for correction of formation parameter data.

Each of the deformation sensors 35 includes one or more strain gauges 38, 40 and 42 for measuring strain, which can be used to calculate deformation parameters such as curvature, bending orientation such as bending tool face angle and well orientation such as inclination, azimuth, and tool face angle. Other non-limiting examples of sensors 35 include magnetometers and inclinometers configured to provide inclination, azimuth, and/or toolface angle data. As described herein, "deformation parameters" refer to parameters relating to downhole component deformation or changes in the geometry of downhole components that could potentially cause misalignment of formation property sensors.

An exemplary orthogonal coordinate system includes a z-axis that corresponds to the longitudinal axis of the downhole component, and perpendicular x- and y-axes. In one embodiment, the sensors 35 are configured to take independent perpendicular bending moment measurements at selected cross-sectional locations of the tool 32. For example, the strain gauges 38 and 40 are configured to take bending moment measurements about the y-axis and x-axis, respectively.

The processor may be configured to estimate and correct for misalignment of formation property sensors based on a mathematical mechanics simulation model of the BHA or other component carrying the formation parameter sensors. The mechanics model may be constructed based on geometric data describing the component, material data describing material properties of drill string components, forces applied to one or more drill string components, and/or data related to deformation or movement of the component. In one embodiment, the data includes drilling dynamics data, and optionally deformation data from discrete deformation sensors. In one embodiment, the processor predicts a bending line, also referred to as a bending figure, of the component under various mechanical deformation conditions. The bending line can be interpreted as a representation of the spatial position of the BHA components in three-dimensions.

A variety of information can be used to feed the model, such as directional survey measurements, drilled distance, rate of penetration (ROP), rotational velocity measurements and drilling dynamics measurements (loads, forces, accelerations, strain, stress, etc.). Drilling dynamics measurements include, for example, bending and bending orientation measurements at specific locations, weight on bit measurements, and/or torque on bit measurements. Drilling dynamics data can be acquired from downhole and/or surface measurements. For example, the drilling sensor sub shown in FIG. 2 includes sensors for measuring weight on bit (WOB), torque on bit (TOB), annulus and internal pressure, and annulus and instrument temperature. It is noted that, although deformation sensors may be used, the processor can use the mechanics model with or without deformation measurements at the formation parameter sensor locations. For example, the model may be used to simulate bending using drilling dynamics data without needing any deformation measurements from discrete deformation sensors at any downhole location or at least at each formation parameter sensor location.

For example, the processor is configured to receive downhole data such as drilling dynamics data, as well as additional data (e.g., from a user or database or computer program) such as borehole size, data of borehole components such as component size/shape and material, or properties of borehole fluid (e.g., mud) such as mud composition, mud density, temperature, flow velocity, solid content, mud basis. In one embodiment, the surface processing unit 36 is configured as a surface drilling control unit which controls various drilling parameters such as rotary speed, weight-on-bit, drilling fluid flow parameters and others and records and displays real-time formation evaluation data. The surface processing unit 36, the tools 32 and/or other components may also include components as necessary to provide for storing and/or processing data collected from various sensors in the drilling assembly 20 or at the surface. Exemplary components include, without limitation, at least one processor, controller, storage, memory, input devices, output devices and the like.

The processor can, based on the model, predict the two-dimensional or three-dimensional deformation, e.g. the bending, bending orientation, and/or bending line, and the resulting path of the component. Based on the deformation, the relative orientations of the formation parameter sensors (e.g., the transmitting and receiving antennas) can be estimated so that formation parameter data can be properly corrected.

In one embodiment, the model is constructed based on drilling dynamics data or other data related to deformation without discrete deformation sensors at each formation parameter sensor location or without any discrete downhole deformation sensors. Such embodiments address several drawbacks associated with designs that include deformation sensors locally at each formation parameter sensor. In such designs bending sensors have to be added to the measurement instrument, increasing cost and complexity. Furthermore, the assumption of a circular bending line between the formation parameter sensors is true only for specific geometries. Other bending lines may result as a consequence of the effects of various factors, such as gravity, borehole geometry, stabilizer placement, weight on bit, and steering forces. Embodiments described herein overcome these drawbacks.

Figure 3:
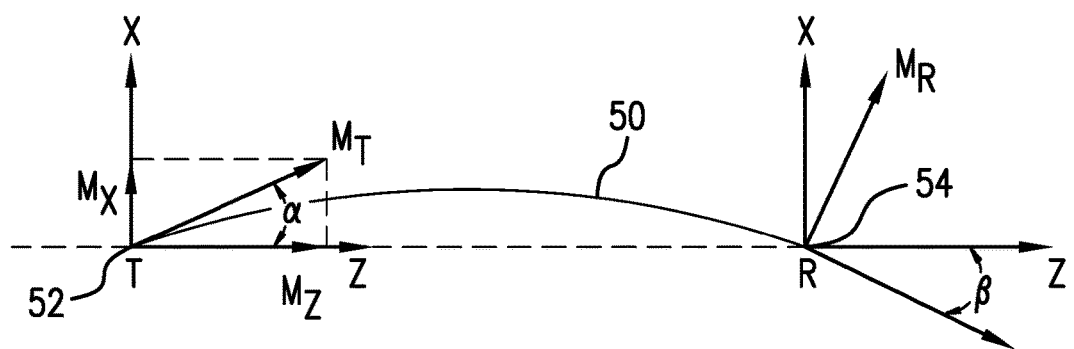
FIG. 3 is a diagram that illustrates an example of deformation of a downhole component and the effect of the deformation on formation parameter sensor alignment.

FIG. 3 shows an example of a change in orientation and effect on measurements due to deformation, which can be estimated using the mechanics model as described herein. A coordinate system includes a z-axis, an x-axis and a y-axis (not shown) that are orthogonal to one another. Prior to deformation, the downhole component extends in the z-axis direction, i.e., the downhole component axis aligns with the z-axis. When the component deforms, the component axis extends along a curve, shown as bending line 50. In this example, the downhole component (e.g., a BHA 24 or drill string length) bending causes a geometric misalignment of distributed electromagnetic sensors (a transmitter antenna and a receiver antenna) located at positions 52 and 54, which causes a change in the measured signal at the receiver antenna. This is important for so called cross-component configurations where the transmitter or receiver antennas are orthogonal to each other, or configurations where transmitter and receiver antennas are tilted relative to each other, e.g., where an angle between a transmitter and receiver antennas is less than 90 degrees, or in co-axial configurations where transmitter and receiver antennas are sensitive into the same direction. As shown in FIG. 3, due to the bending the antenna moments $M_T$ and $M_R$ such as the magnetic antenna dipole moments are tilted relative to the axes connecting transmitter and receiver positions T and R, respectively. In another embodiment, an acoustic transmitter and receiver is located at positions 52 and 54, configured to determine acoustic parameters of the formation and which are affected by the misalignment of the downhole component as shown in FIG. 3.

FIG. 4 illustrates examples of component deformation and bending, and their effect on sensor orientation, which can be modeled and corrected for as described herein. These examples illustrate the importance of determining the full bending figure of the component as opposed to measuring bending at a localized point and implicitly assuming a bending figure.

In the examples of FIG. 4, a transmitter antenna 60 has an orientation generally perpendicular to a longitudinal axis of a downhole component 62 (e.g. BHA portion). A receiver antenna 64 has an orientation that is configured to be perpendicular to the transmitter antenna orientation. When the component is straight, as shown in FIG. 4a, the receiver antenna is orientated parallel to equipotential lines 66 (shown as dashed lines) of the transmitter antenna 60. In this case, the receiver antenna does not receive a signal directly from the transmitter 60.

Figure 4A:
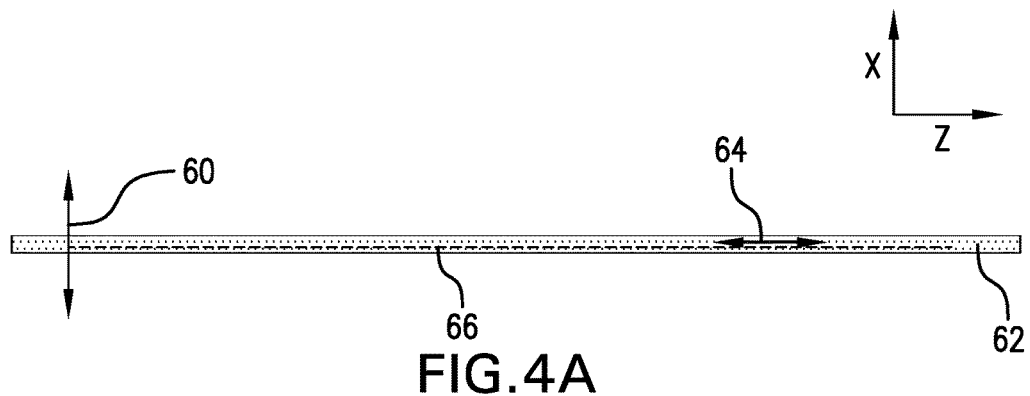
FIGS. 4a-4e (collectively "FIG. 4") depict examples of bending or deformation configurations that may be encountered during a drilling operation.
Figure 4B:
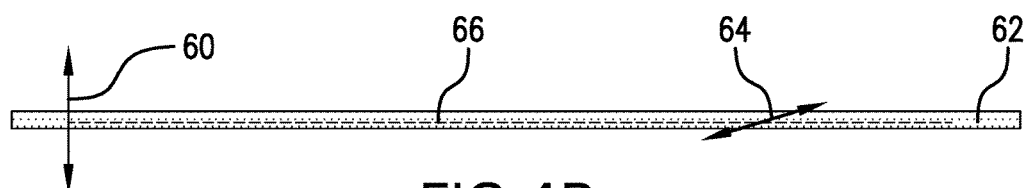
Figure 4C:
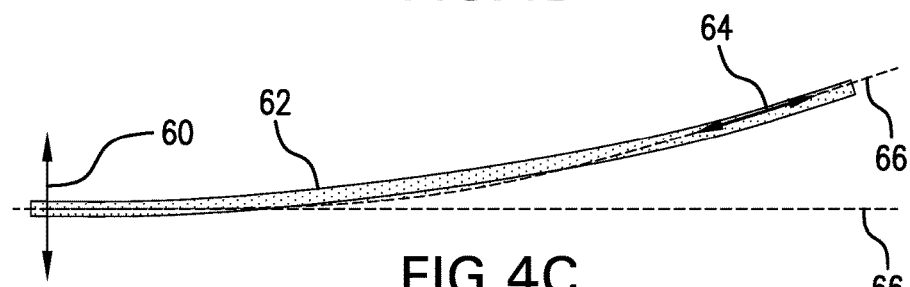
Figure 4D:
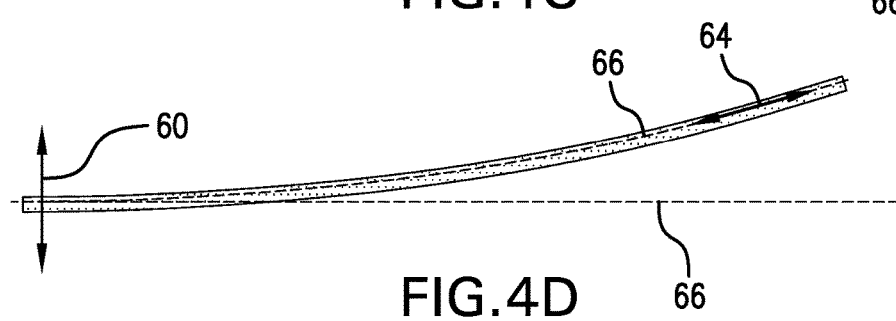

However, if deformation causes the orientation of the transmitter and/or receiver to change, a signal due to deformation is detected by the receiver. Whenever the receiver (Rx) is aligned not parallel to the equipotential lines of the transmitter (Tx) dipole, a signal is induced. For example, as shown in FIG. 4b, the component 62 is straight but the receiver antenna is tilted relative to equipotential lines 66 of the magnetic field of the Tx. A signal is induced, which can be estimated by calculating the normal component of the receiver orientation direction relative to the z-axis.

An arc-shaped, or nearly arc shaped component would be an expected bending figure for a constant curvature borehole. In an arc-shaped curvature (shown in FIG. 4c), the receiver may not be parallel to the equipotential lines, and a signal is induced. In the nearly arc-shaped component of FIG. 4d, a signal may be detected. For example, in the condition shown in FIG. 4d, the receiver antenna 64 is parallel to the equipotential line 66, and in the condition shown in FIG. 4c, the receiver antenna 64 is almost parallel to the equipotential line 66. The reason is that although the receiver antenna 64 is tilted, the equipotential line 66 is also shifted. Both of these effects together can lead to the effect that the measured signal can be small (such as in FIG. 4c) or even neglectable (such as in FIG. 4d) even though the component is deformed.

Figure 4E:
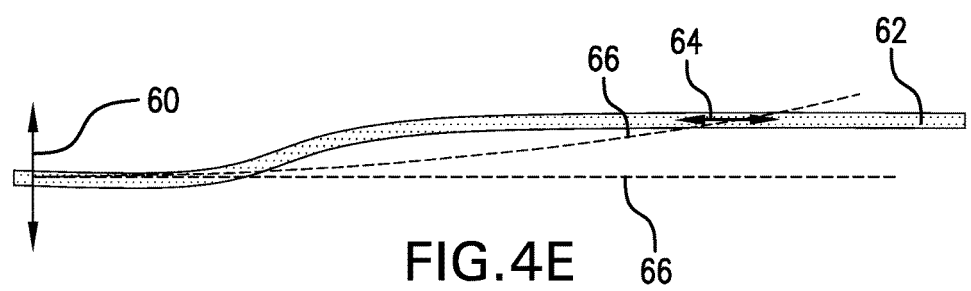

In addition, the component may not have a constant curvature, such as an s-shaped component length having a local dogleg as shown in FIG. 4e. In this case, the receiver may be parallel to the tool axis but be offset, which can induce a signal in the receiver that should be accounted for.

The magnitude of the induced signal can be calculated by decomposing the receiver direction into parallel and normal components relative to an axis, such as an axis extending from the center of the transmitter to the center of the receiver, equipotential lines, or field lines.

The processor constructs or receives a mechanics model, which uses geometric data to generate representations of the geometry of one or more components and interactions between the components, as well as interactions between the components and the borehole wall, during operations such as drilling operations. The model is provided to allow users to simulate conditions and component interactions that are encountered during a drilling operation. The model may be a model of the component at which a formation parameter is located, a second downhole component (e.g., a pipe segment or tool connected to the component) and/or a third downhole component.

Various methods can be used to simulate deflection and misalignment of components such as drilling systems in a borehole. Examples of such methods include a finite element method, a finite difference method and/or a transfer-matrix method. Significant parameters used for such methods include, e.g., directional survey information, or material properties of the BHA such as but not limited to the stiffness of the BHA, the mass of the BHA, BHA geometry, stabilization, additional steering forces, or downhole fluid parameter, such as but not limited to mud density, mud weight, buoyancy, mud composition.

An exemplary model is generated using the finite element method. In one embodiment, a plurality of node elements are generated from the geometric data that correspond to the shape or geometry of different portions of the components. In one embodiment, one or more components are modeled as a three-dimensional model using finite elements such as geometrically nonlinear beam or mass elements.

In one embodiment, each node in the model is given a number of degrees of freedom (e.g., six degrees including three translations and three rotations), and is confined within an area representing the borehole 12 using a penalty function approach. Equations of motion can be used in conjunction with these degrees of freedom and may be integrated using an implicit, variable time step procedure. Systems of coupled, nonlinear equations of motion are used, which are integrated through time to obtain transient and steady state displacements, loads and stresses. Various input forces may be input such as weight-on-bit, drilling rotation speed, fluid pressure, mass imbalance forces, axial stresses, radial stresses, weights of various components, and structural parameters such as stiffness. The nodes and forces described herein are exemplary and not intended to be limiting. Any suitable forces desired to be modeled may be used.

Figure 5:
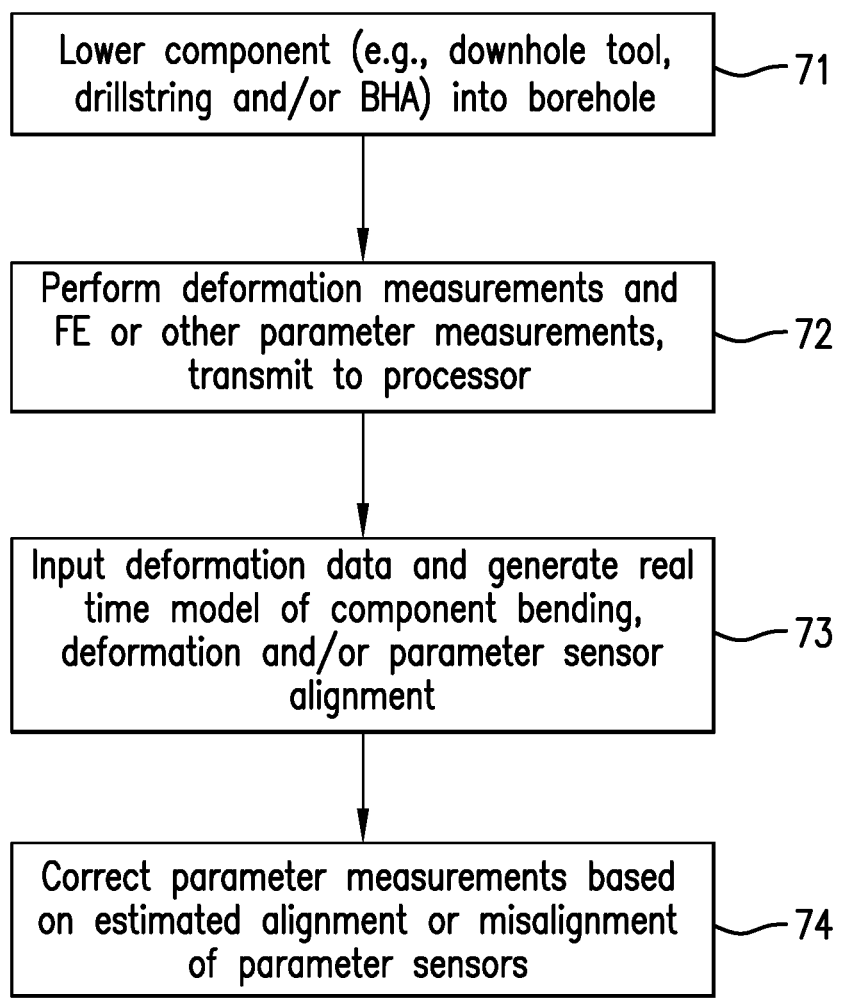
FIG. 5 is a flow chart providing an embodiment of a method of predicting or estimating misalignment of a downhole tool or other downhole component.

FIG. 5 illustrates a method 70 for estimating downhole parameters and correcting measurements based on modeled bending and/or deformation information. The method 70 includes one or more of stages 71-74 described herein, at least portions of which may be performed by a processor (e.g., the surface processing unit 36 or tool 32). In one embodiment, the method includes the execution of all of stages 71-74 in the order described. However, certain stages 71-74 may be omitted, stages may be added, or the order of the stages changed.

In the first stage 71, the downhole tool 34, the BHA 24 and/or the drilling assembly 20 are lowered into the borehole 12 during a drilling and/or directional drilling operation. Although the method is described herein as part of a drilling and geo-steering operation, it is not so limited, and may be performed with any desired downhole operation (e.g., a wireline operation).

In the second stage 72, various downhole measurements are performed during the drilling operation and transmitted to a processor, such as the surface processing unit 36. Various deformation measurements such as force or operation parameter measurements are obtained. For example, the deformation measurements include drilling dynamics measurements such as weight on bit (WOB), torque-on-bit (TOB), steer force or orientation (e.g., bending sub or motor orientation). Other data relating to component bending or deformation may also be generated by deformation sensors, such as strain, bending moment, azimuth and/or inclination data. A distributed array of sensor devices 35 may be used to provide a plurality of measurements corresponding to a plurality of locations along the component. The deformation data may be acquired for the downhole component at which formation parameter sensors are located, at a second downhole component and/or at a third downhole component. The number and location of downhole components for which deformation data is acquired and the number and location of downhole components that are modeled via a mechanics model is not limited to the embodiments described herein.

In one embodiment, these measurements are transmitted to the processor in real time or near real time. The measurements may be taken at least substantially continuously or periodically, and then transmitted (e.g., in real time) to the processor. Other measurements such as formation evaluation measurements may also be taken. In one embodiment, various sensor devices are incorporated into an integrated downhole tool or other component that measures various directional and evaluation parameters in real time as part of a MWD method.

In the third stage, 73 the deformation (e.g., force and/or operational measurement) data is input into an algorithm to generate and/or update a mathematical mechanics model of the position and forces on components such as the drill string 11 or portions thereof, the BHA 24, the tool 34 and the drilling assembly 20. The model is configured as a model of bending and/or deformation characteristics of the component. The model may be built using information including the geometrical layout of the downhole component(s), downhole component materials, the borehole trajectory and hole size, as well as real-time measurements of forces and bending/deformation measurements such as WOB, TOB and steer forces. In one embodiment, the location and orientation of various parameter (e.g., FE) sensors is also input into the model or otherwise used to estimate an alignment of each parameter sensor 34 relative to other sensors 34 on the drill string 11. This data may be input to an algorithm for generating a model of the alignment or misalignment of the component(s).

The bending/deformation characteristic measurements (and any evaluation parameter measurements) may be received in real-time by the processor, and the processor may automatically, without user intervention, generate and/or update the model in real time using at least the deformation measurements. The measurements may be, for example, displayed and/or transmitted to a user to allow the user to build and/or update the model to estimate misalignment of any of the sensors 34 along a complete portion of the drill string 11. In one embodiment, the measurements are automatically received and processed by the processor, which automatically builds and/or updates the predictive model during the drilling operation.

In one embodiment, generation of the model includes calculating the alignment/misalignment of the sensors 34 at selected locations based on the deformation measurements and the bending model. For example, bending and misalignment are calculated using algorithms or software such as BHASysPro software developed by Baker Hughes, Inc.

In one embodiment, the model incorporates deformation measurements from an array of sensor devices 35 located along an axis of the component and measures deformation data at each of the sensor locations. The model provides deformation and bending information at locations between adjacent sensors 35 along the array.

In one embodiment, the model is generated based on drilling dynamics data or deformation data other than from discrete deformation sensors, although measurements from discrete deformation sensors can also be used if available.

The model may therefore be a predictive model of deformation and bending of the complete component, both at formation parameter sensor locations and substantially continuously at regions between and away from the sensor locations. This model may be generated/updated in real-time during the drilling process and utilized during the drilling process to correct parameter measurements.

The resulting model includes estimations of deformation (e.g., deflection, rotation, strain, torsion and/or bending) along a selected portion of the model, including portions of the model that are located between distributed sensors and/or portions that do not have a sensor disposed thereat. In this way, deformation and alignment or misalignment estimations may be generated along an entire portion of the component(s), including portions between sensors.

In one embodiment, other downhole measurements may be taken to validate the model or to further correct the model. For example, the sensors 35 shown in FIG. 2 may be included at selected discrete locations along the drill string 11, and strain and/or bending information is used to confirm bending estimations taken from the model. For example, actual bending moment measurements generated by the sensors 35 are compared to estimated bending moment measurements taken from the model to determine whether the model is accurate and/or that the estimations are within an acceptable range relative to actual measurements.

In the fourth stage 74, the model and alignment estimations for various sensors are utilized to correct downhole parameter measurements. For example, downhole measurement tools include multiple sensors 34 that are oriented to measure parameters of a borehole (e.g., resistivity). Such sensors 34 are configured to measure along the same axis or otherwise have a selected alignment relative to each other. Alignment information taken from the model is used to determine whether there is any misalignment of a sensor 34 relative to other sensors 34 and/or relative to a desired alignment. If a sensor 34 is found to be misaligned, the measurements resulting from the sensor 34 are adjusted or corrected by a user to compensate for such misalignment. As used herein, a "user" may include a drill string or logging operator, a processing unit and/or any other entity selected to retrieve the data and/or control the drill string 11 or other system for lowering tools into a borehole 12. In addition, the information from the model may also be used to correct geo-steering operations. The user may take any appropriate actions based on the model data to, for example, change operational parameters such as steering course or drilling parameters.

The correction may be applied to signals received at a receiver antenna or other receiver configured to have a specific orientation relative to a transmitter. For example, if the transmitter antenna is determined to be misaligned, the contribution of the signal due to misalignment can be determined by estimating the orientation or angle of the receiver relative to an axis connecting the transmitter to the receiver when in the misaligned state.

Figure 6:
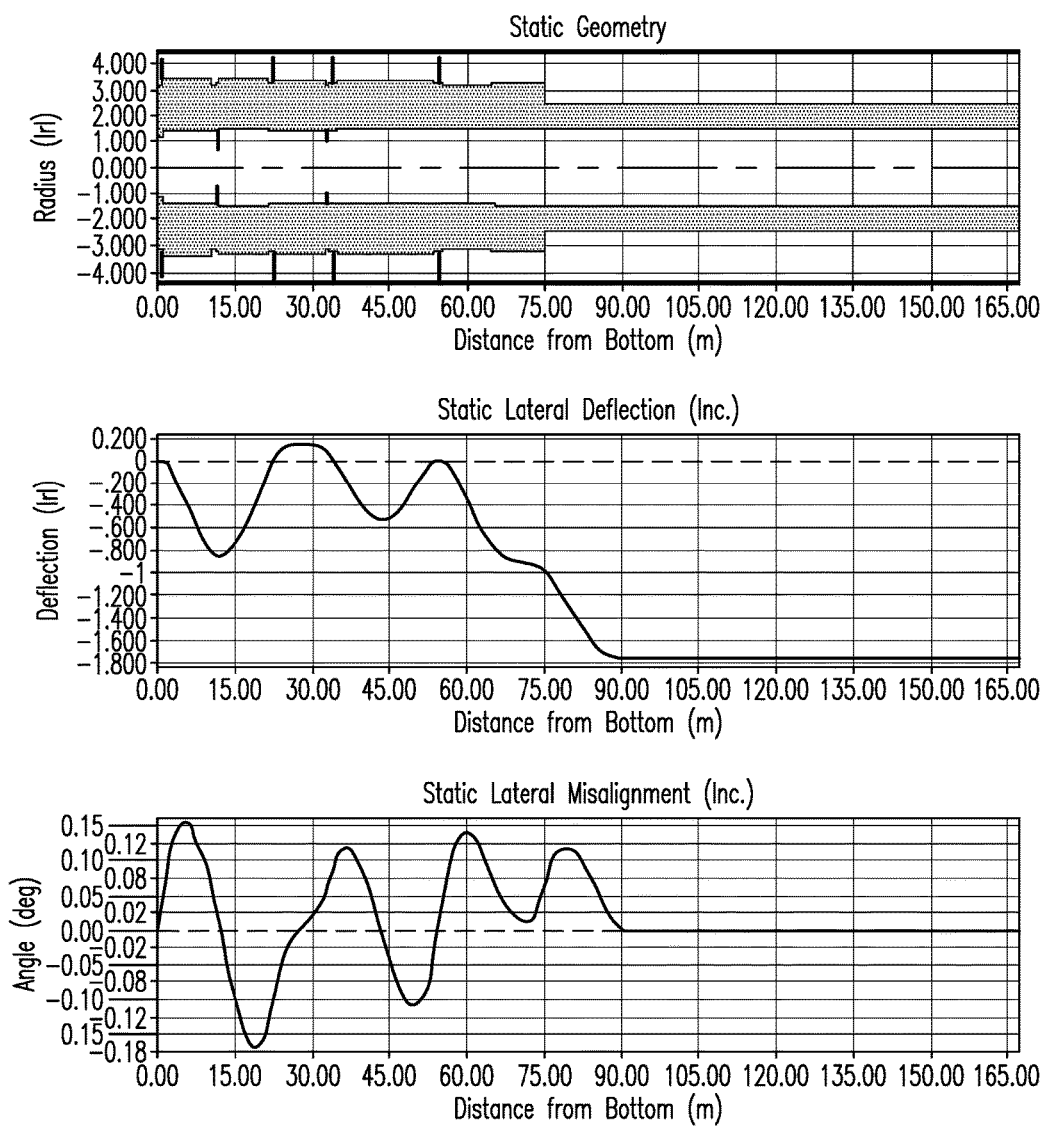
FIG. 6 depicts an example of component deformation data derived using a mathematical mechanics model of a downhole component according to various embodiments.

FIG. 6 shows an example of an output of the mechanics model that can be used to calculate deflection or bending and estimate misalignment of formation parameter sensors therefrom. In this example, aspects of the model and the model results are shown, which include a geometric description of a component, as well as the deflection and angle of the component as a function of the length of the component and/or borehole 12. As indicated above, the model outputs can be generated and used for correcting for signals due to misalignment using drilling dynamics data without discrete deformation sensor measurements at sensor locations.

In addition to the static deflection and misalignment a dynamic deflection and misalignment due to vibration can occur and being corrected for. The frequencies of mechanical vibrations are magnitudes smaller than those forming the basis for the resistivity or acoustic measurements. For example, eigenforms of vibrations can be calculated and correlated to dynamic lateral deflection. From the deflection, a dynamic misalignment can be estimated.

Figure 7:
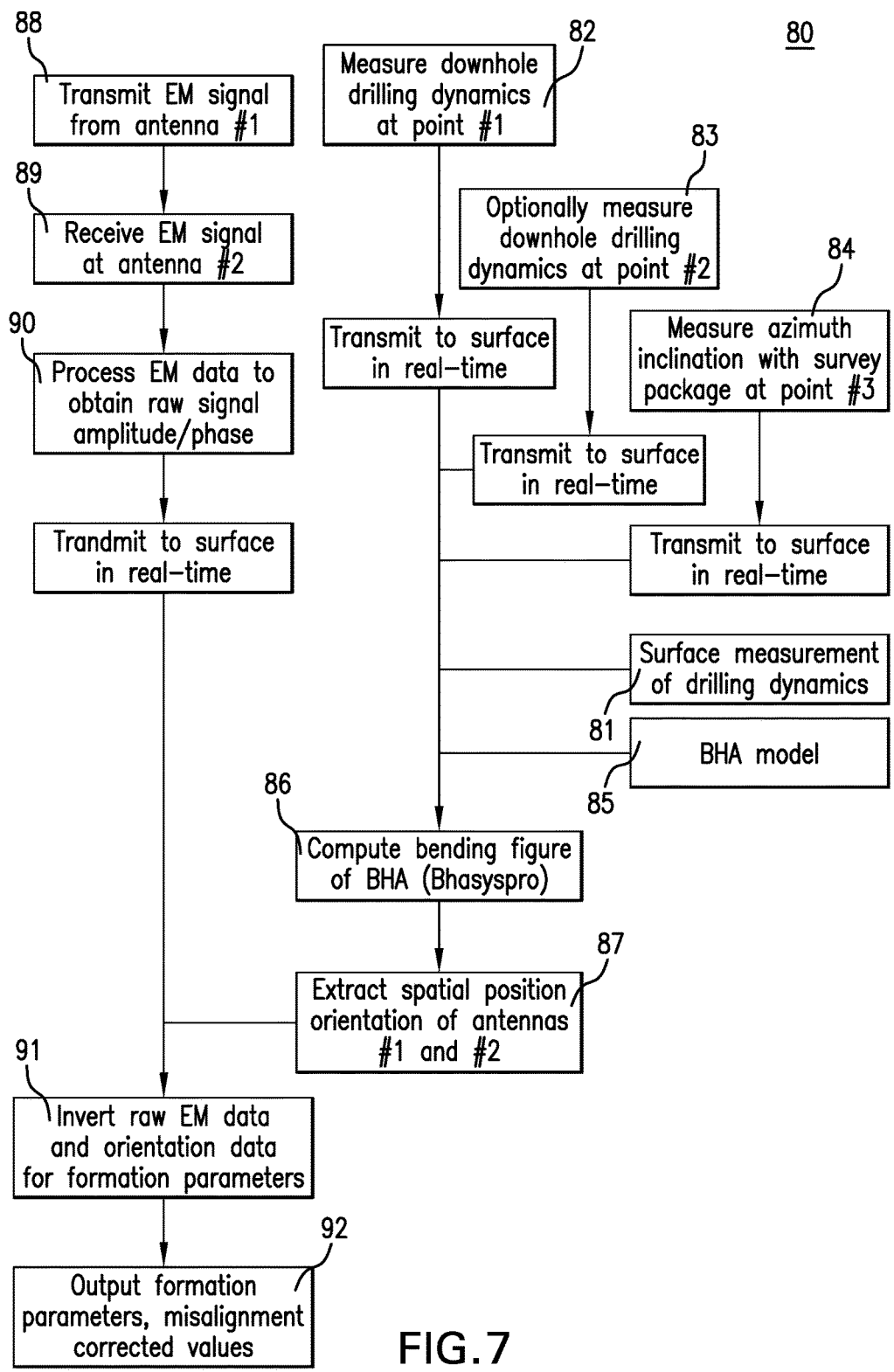
FIG. 7 is a flow chart providing an embodiment of a method of predicting or estimating misalignment of formation parameter sensors and correction of formation parameter measurement data.
Figure 8:
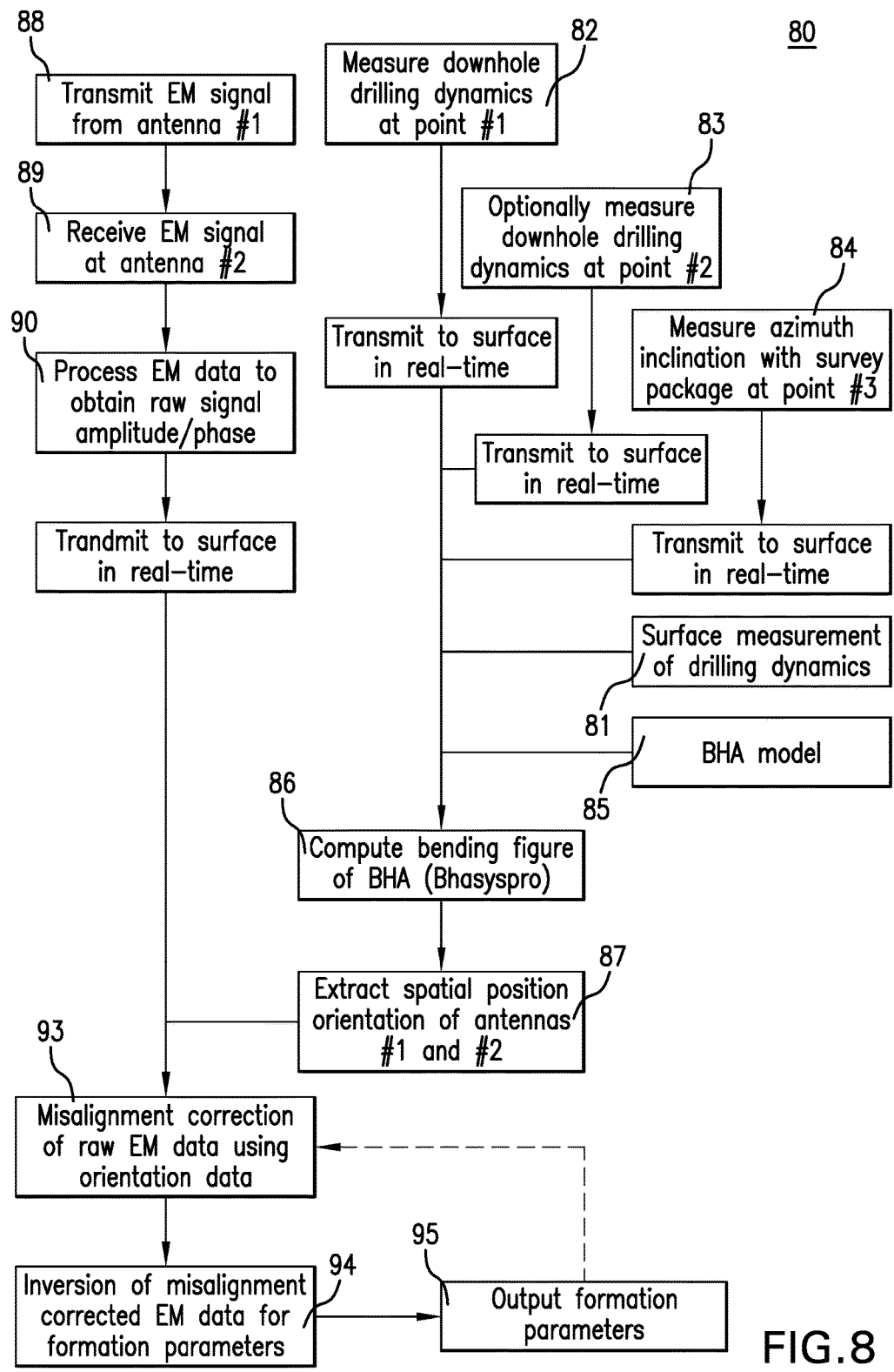
FIG. 8 is a flow chart providing an alternative embodiment of the method of FIG. 7.
Figure 9:
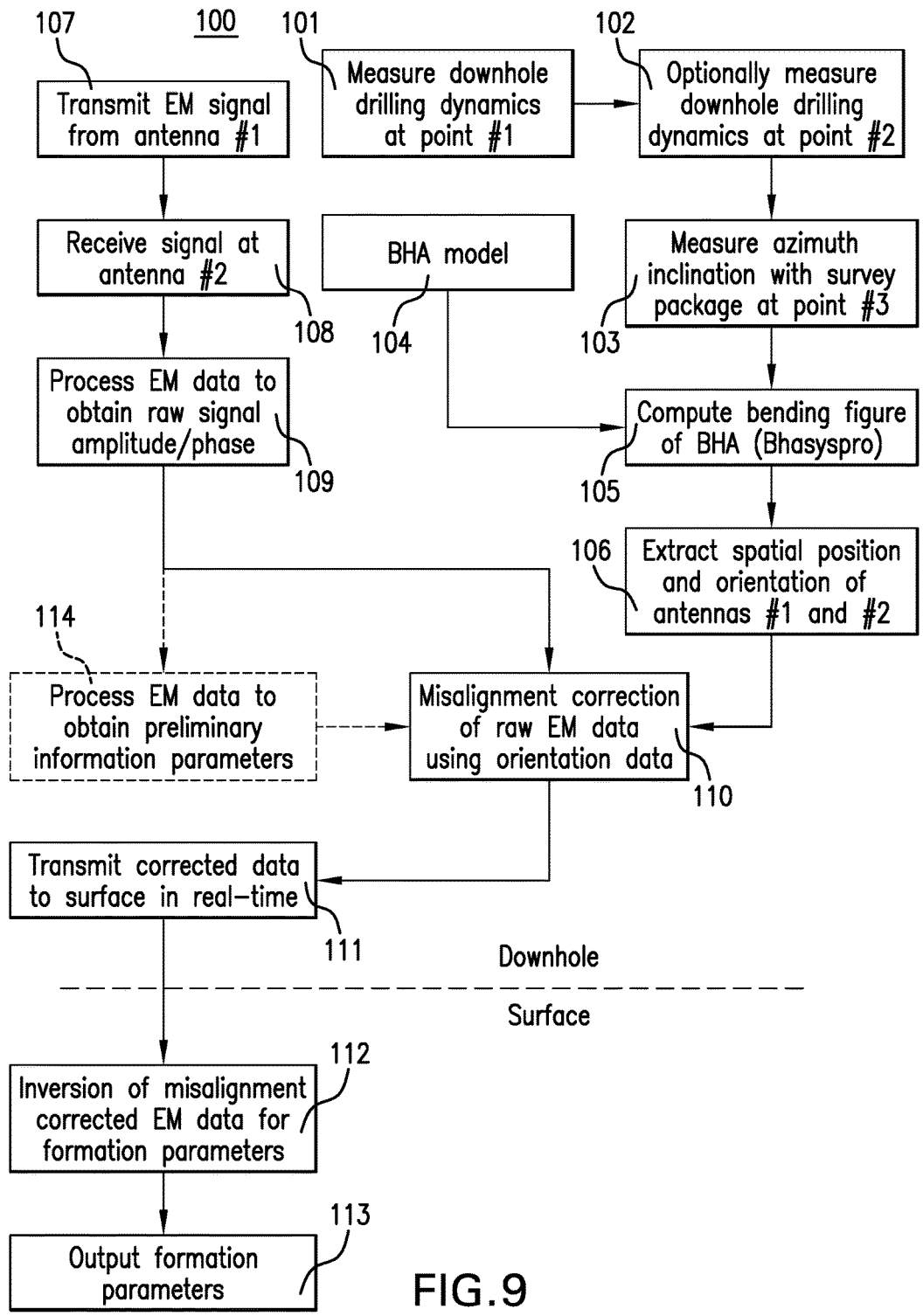
FIG. 9 is a flow chart providing an embodiment of a method of predicting or estimating misalignment of formation parameter sensors and correction of formation parameter measurement data.

FIGS. 7-9 are workflow diagrams showing various embodiments of methods of modeling a downhole component, estimating sensor misalignment and correcting or calibrating formation parameter data. In these examples, the formation parameter sensors are resistivity sensors that have orthogonally oriented transmitter and receiver antennas. Transmitter and receiver antennas used for resistivity or other measurements may be orthogonal as in these examples, or have other configurations such as co-axial configurations, or tilted configurations where the angle between transmitter and receiver antenna orientations is less than 90 degrees. The methods can be performed in real time during a drilling or other energy industry operation, and used to take various actions including correcting or calibrating formation parameter data, modifying component designs or operation plans, and/or adjusting operational parameters (e.g., ROP, WOB, fluid pressure, etc.). Although the methods are discussed below in conjunction with a BHA, the methods can be applied to any downhole component that carriers formation parameter sensors.

In one embodiment, shown in FIG. 7, an embodiment of a method 80 includes gathering drilling dynamics from several sources for at least a first location (block 81), such as the surface, and for at least a second location such as at a BHA (block 82). Drilling dynamics data can optionally be collected for one or more other locations (block 83). If a survey package or other deformation sensors are available, deformation data can be acquired (block 84). The drilling dynamics data and a mechanics model of the component (block 85) are combined to generate orientation data including a bending profile or figure of the BHA based on the model or using the algorithms implemented in modeling software (block 86). Using the bending profile, the spatial position and orientation in three-dimensional space of the antennas is extracted (block 87).

Formation parameter data is acquired by transmitting a signal from a transmitter antenna (block 88), receiving a signal at a receiver antenna (block 89) and processing the received signals to obtain the amplitude and phase of the received signal (block 90). At block 91, the bending data and the formation parameter data is combined using appropriate interpretation software. At block 91, the formation parameter and orientation data is jointly inverted for desired formation parameters, such as a resistivity, a conductivity, a dielectric constant, an acoustic velocity, water saturation, porosity, density, permeability, anisotropy, distance to bed, and distance to anomaly. Corrected formation parameter data is then output, optionally along with misalignment and correction information (block 92).

FIG. 8 shows an alternative implementation of the method 80. In this implementation, the mathematical inversion does not consider the misalignment. Rather the raw data is corrected (block 93) by some other means, for instance by geometric considerations as described in U.S. Pat. No. 9,062,540, issued on Jun. 23, 2015, the entirety of which is incorporated by reference herein. The corrected data is then inverted to derive formation parameters (block 94). Optionally, the algorithm for misalignment correction for EM data shown in block 93 could use formation parameters (block 95) computed in a previous step to improve the correction.

FIG. 9 shows an embodiment as a method 100, in which misalignment correction is performed downhole by a downhole processing device (e.g., a processor in the BHA itself) based on downhole data only.

Drilling dynamics data is gathered from a first downhole location (block 101) and optionally from one or more additional downhole locations (block 102). If a survey package or other deformation sensors are available, deformation data can be acquired (block 103). The drilling dynamics data and a mathematical mechanics model of the component (block 104) are combined to generate orientation data including a bending profile or figure of the BHA (block 105). Using the bending profile, the spatial position and orientation in three-dimensional space of the antennas are extracted (block 106).

Formation parameter data is acquired by transmitting a signal from a transmitter antenna (block 107), receiving a signal at a receiver antenna (block 108) and processing to obtain raw data including the amplitude and phase of the received signal (block 109). The raw data is corrected based on the misalignment at block 110, and the corrected data is transmitted to a surface processor (block 111). The corrected data may then be inverted by the surface processor (block 112) to output corrected formation parameters (block 113). The correction can be improved by optionally processing the data to obtain preliminary (uncorrected) formation parameters (block 114). For example, a measurement with co-axial coils could be used to compute an apparent resistivity of the formation surrounding the BHA prior to correction.

The embodiments described above could be extended to other relevant configurations. For example, measured EM data could be continuous wave data or transient data. Also, the combination could be used for more than 2 antennas. For example, an EM measurement tool (e.g., a resistivity measurement device includes a receiver Rx, a transmitter Tx, and cross- and coaxial antennas such as an antenna oriented parallel to the tool axis (denoted as Z) and an antenna oriented perpendicular to the tools axis (denoted as X). Examples of combinations are shown in the following table:

| Antenna 1 | Antenna 2 | Antenna 3 |
|-----------|-----------|-----------|
| X-Tx | X-Tx | Z-Rx |
| Z-Tx | Z-Tx | X-Rx |
| X-Tx | Z-Rx | Z-Rx |
| Z-Tx | X-Rx | X-Rx |
| Z-Tx | X-Rx | Z-Rx |

Other combinations and larger numbers of antennas or antennas at an angle different from 0° or 90° could be used.

As used herein generation of data in "real time" is taken to mean generation of data at a rate that is useful or adequate for making decisions during or concurrent with processes such as production, experimentation, verification, and other types of surveys or uses as may be opted for by a user. As a non-limiting example, real time measurements and calculations may provide users with information necessary to make desired adjustments during the drilling process. In one embodiment, adjustments are enabled on a continuous basis (at the rate of drilling), while in another embodiment, adjustments may require periodic cessation of drilling for assessment of data. Accordingly, it should be recognized that "real time" is to be taken in the context of making decisions during the process, and does not necessarily indicate the instantaneous determination of data, or make any other suggestions about the temporal frequency of data collection and determination. The systems and methods described herein provide various advantages over prior art techniques. For example, the systems and methods allow for real time estimation of downhole component misalignment (e.g., relative to the borehole 12 and/or desired alignment) and correction of parameter measurements, and further provides for automatic updating of mathematical models of the component and the borehole 12 to provide a complete picture of alignment both at locations of sensors and locations where sensors are not disposed. The misalignment can thus be predicted with a relatively low number of distributed sensors.

Other advantages include a stream-lined process for directly modeling misalignment to provide a predicted model of misalignment, which relieves a user of the additional steps of comparing alignment data to a pre-programmed model of the drill string 11. Such characteristics allow for improved misalignment measurements of a complete drill string closer in time to the actual measurements, which in turn allows for quicker correction of the drilling operation.

Set forth below are some embodiments of the foregoing disclosure:

Embodiment 1. A system for estimating a parameter of an earth formation, the system comprising: at least one formation parameter sensor disposed at a first downhole component and configured to measure a parameter of an earth formation to generate formation parameter data; and one or more processors in operable communication with the at least one formation parameter sensor, the one or more processors configured to perform: generating a mechanics model of at least one of the first downhole component and a second downhole component, the mechanics model based on geometrical data representing at least one of the first downhole component and the second downhole component; estimating a misalignment of the at least one formation parameter sensor by using the mechanics model; and correcting the formation parameter data based on the misalignment.

Embodiment 2. The system of any prior embodiment, further comprising at least one measurement device configured to generate deformation data of at least one of the first downhole component, the second downhole component, and a third downhole component.

Embodiment 3. The system of any prior embodiment, wherein the mechanics model is based on the geometrical data and the deformation data.

Embodiment 4. The system of the system of any prior embodiment, wherein estimating the misalignment is performed in real time during a downhole operation.

Embodiment 5. The system of any prior embodiment, wherein the mechanics model is based on one or more of: a material property, a downhole fluid parameter and directional survey data.

Embodiment 6. The system of any prior embodiment, wherein the at least one formation parameter sensor includes a transmitter and a receiver, and estimating the misalignment includes estimating an orientation of the receiver relative to an orientation of the transmitter.

Embodiment 7. The system of any prior embodiment, wherein a configuration of the receiver and the transmitter is one of a cross component configuration and a tilted configuration.

Embodiment 8. The system of any prior embodiment, wherein the formation parameter comprises at least one of a resistivity, a conductivity, a dielectric constant, an acoustic velocity, water saturation, porosity, density, permeability, anisotropy, distance to bed, and distance to anomaly.

Embodiment 9. The system of any prior embodiment, wherein the downhole component is part of a drilling system, and the mechanics model is based on the geometrical data and a drilling dynamics parameter.

Embodiment 10. The system of any prior embodiment, wherein the drilling dynamics parameter is selected from at least one of weight-on-bit, torque-on-bit, rate-of penetration, rotational rate, a steering force, bending of a downhole component, bending orientation of a downhole component, and an orientation of the downhole component.

Embodiment 11. A method of estimating a parameter of an earth formation, the method comprising: measuring, by at least one formation parameter sensor disposed at a first downhole component, a parameter of an earth formation and generating formation parameter data; generating, by one or more processors in operable communication with the at least one formation parameter sensor, a mechanics model of at least one of the first downhole component and a second downhole component, the mechanics model based on geometrical data representing at least one of the first downhole component and the second downhole component; estimating a misalignment of the at least one formation parameter sensor by using the mechanics model; and correcting the formation parameter data based on the misalignment.

Embodiment 12. The method of any prior embodiment, further comprising generating deformation data of at least one of the first downhole component, the second downhole component, and a third downhole component.

Embodiment 13. The method of any prior embodiment, wherein the mechanics model is based on the geometrical data and the deformation data.

Embodiment 14. The method of any prior embodiment, wherein estimating the misalignment is performed in real time during a downhole operation.

Embodiment 15. The method of any prior embodiment, wherein the mechanics model is based on one or more of: a material property, a downhole fluid parameter and directional survey data.

Embodiment 16. The method of any prior embodiment, wherein the at least one formation parameter sensor includes a transmitter and a receiver, and estimating the misalignment includes estimating an orientation of the receiver relative to an orientation of the transmitter.

Embodiment 17. The method of any prior embodiment, wherein the configuration of the receiver and the transmitter is one of a cross component configuration and a tilted configuration.

Embodiment 18. The system of any prior embodiment, wherein the formation parameter comprises at least one of a resistivity, a conductivity, a dielectric constant, an acoustic velocity, water saturation, porosity, density, permeability, anisotropy, distance to bed, and distance to anomaly.

Embodiment 19. The method of any prior embodiment, wherein the downhole component is part of a drilling system, and the mechanics model is based on the geometrical data and a drilling dynamics parameter.

Embodiment 20. The method of any prior embodiment, wherein the drilling dynamics parameter is selected from at least one of weight-on-bit, torque-on-bit, rate-of penetration, rotational rate, a steering force, bending of a downhole component, bending orientation of a downhole component, and an orientation of the downhole component.

Generally, some of the teachings herein are reduced to an algorithm that is stored on machine-readable media. The algorithm is implemented by a computer or processor such as the surface processing unit 36 or the tool 32 and provides operators with desired output. For example, electronics in the tool 32 may store and process data downhole, or transmit data in real time to the surface processing unit 36 via wireline, or by any kind of telemetry such as mud pulse telemetry or wired pipes during a drilling or measurement-while-drilling (MWD) operation In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A system for estimating a parameter of an earth formation, the system comprising:
   at least one formation parameter sensor disposed at a first downhole component and configured to measure a parameter of an earth formation to generate formation parameter data; and
   one or more processors in operable communication with the at least one formation parameter sensor, the one or more processors configured to perform:
   generating a mechanics model of at least one of the first downhole component and a second downhole component, the mechanics model based on geometrical data representing at least one of the first downhole component and the second downhole component;
   estimating a misalignment of the at least one formation parameter sensor by using the mechanics model; and
   correcting the formation parameter data based on the misalignment.

2. The system of claim 1, further comprising at least one measurement device configured to generate deformation data of at least one of the first downhole component, the second downhole component, and a third downhole component.

3. The system of claim 2, wherein the mechanics model is based on the geometrical data and the deformation data.

4. The system of claim 1, wherein estimating the misalignment is performed in real time during a downhole operation.

5. The system of claim 1, wherein the mechanics model is based on one or more of: a material property, a downhole fluid parameter and directional survey data.

6. The system of claim 1, wherein the at least one formation parameter sensor includes a transmitter and a receiver, and estimating the misalignment includes estimating an orientation of the receiver relative to an orientation of the transmitter.

7. The system of claim 6, wherein a configuration of the receiver and the transmitter is one of a cross component configuration and a tilted configuration.

8. The system of claim 1, wherein the formation parameter comprises at least one of a resistivity, a conductivity, a dielectric constant, an acoustic velocity, water saturation, porosity, density, permeability, anisotropy, distance to bed, and distance to anomaly.

9. The system of claim 1, wherein the downhole component is part of a drilling system, and the mechanics model is based on the geometrical data and a drilling dynamics parameter.

10. The system of claim 9, wherein the drilling dynamics parameter is selected from at least one of weight-on-bit, torque-on-bit, rate-of penetration, rotational rate, a steering force, bending of a downhole component, bending orientation of a downhole component, and an orientation of the downhole component.

11. A method of estimating a parameter of an earth formation, the method comprising:
   measuring, by at least one formation parameter sensor disposed at a first downhole component, a parameter of an earth formation and generating formation parameter data;
   generating, by one or more processors in operable communication with the at least one formation parameter sensor, a mechanics model of at least one of the first downhole component and a second downhole component, the mechanics model based on geometrical data representing at least one of the first downhole component and the second downhole component;
   estimating a misalignment of the at least one formation parameter sensor by using the mechanics model; and
   correcting the formation parameter data based on the misalignment.

12. The method of claim 11, further comprising generating deformation data of at least one of the first downhole component, the second downhole component, and a third downhole component.

13. The method of claim 12, wherein the mechanics model is based on the geometrical data and the deformation data.

14. The method of claim 11, wherein estimating the misalignment is performed in real time during a downhole operation.

15. The method of claim 11, wherein the mechanics model is based on one or more of: a material property, a downhole fluid parameter and directional survey data.

16. The method of claim 11, wherein the at least one formation parameter sensor includes a transmitter and a receiver, and estimating the misalignment includes estimating an orientation of the receiver relative to an orientation of the transmitter.

17. The method of claim 16, wherein the configuration of the receiver and the transmitter is one of a cross component configuration and a tilted configuration.

18. The system of claim 11, wherein the formation parameter comprises at least one of a resistivity, a conductivity, a dielectric constant, an acoustic velocity, water saturation, porosity, density, permeability, anisotropy, distance to bed, and distance to anomaly.

19. The method of claim 11, wherein the downhole component is part of a drilling system, and the mechanics model is based on the geometrical data and a drilling dynamics parameter.

20. The method of claim 19, wherein the drilling dynamics parameter is selected from at least one of weight-on-bit, torque-on-bit, rate-of penetration, rotational rate, a steering force, bending of a downhole component, bending orientation of a downhole component, and an orientation of the downhole component.

\* \* \* \* \*